United States Patent [19]
Klein

[11] Patent Number: 6,073,995
[45] Date of Patent: *Jun. 13, 2000

[54] POWERED VENTING PANEL ASSEMBLY

[75] Inventor: George W. Klein, Dearborn Heights, Mich.

[73] Assignee: ASC Incorporated, Southgate, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,307

[22] Filed: Aug. 5, 1997

[51] Int. Cl.[7] ...................................................... B60J 7/00
[52] U.S. Cl. ........................ 296/216.02; 296/223; 49/324
[58] Field of Search ............................... 296/216.02, 218, 296/223, 216.03; 49/324, 340, 341, 357, 352

[56] References Cited

U.S. PATENT DOCUMENTS

| 3,022,108 | 2/1962 | Cooley ...................................... 49/340 |
| 3,949,624 | 4/1976 | Biernert . |
| 3,955,848 | 5/1976 | Lutz et al. . |
| 3,974,753 | 8/1976 | Blomgren et al. . |
| 4,005,901 | 2/1977 | Lutke et al. . |
| 4,067,605 | 1/1978 | Green et al. . |
| 4,130,966 | 12/1978 | Kujawa, Jr. et al. . |
| 4,186,524 | 2/1980 | Pelchat ...................................... 49/357 |
| 4,193,628 | 3/1980 | Sorensen . |
| 4,219,231 | 8/1980 | Igel ........................................ 296/218 |
| 4,227,738 | 10/1980 | Sorensen . |
| 4,227,739 | 10/1980 | Sorensen . |
| 4,231,608 | 11/1980 | Sorensen . |
| 4,231,609 | 11/1980 | Sorensen . |
| 4,371,204 | 2/1983 | George et al. . |
| 4,402,536 | 9/1983 | Green et al. . |
| 4,573,107 | 2/1986 | Stock et al. ............................... 362/49 |
| 4,626,025 | 12/1986 | Haecker et al. ......................... 296/218 |
| 4,772,765 | 9/1988 | Markle et al. . |
| 4,918,865 | 4/1990 | Hirai ......................................... 49/357 |
| 4,920,698 | 5/1990 | Friese et al. . |
| 5,018,783 | 5/1991 | Chamings et al. ....................... 296/219 |
| 5,033,789 | 7/1991 | Hayashi et al. ....................... 296/216.02 |
| 5,069,502 | 12/1991 | Sekine et al. ............................. 296/223 |
| 5,154,482 | 10/1992 | Hayashi et al. .......................... 296/223 |
| 5,295,925 | 3/1994 | Hirabayashi ............................. 475/337 |
| 5,477,642 | 12/1995 | Legendre .................................. 49/340 |

FOREIGN PATENT DOCUMENTS

| 507486 | 10/1992 | European Pat. Off. .......... 296/216.02 |
| 2813651 | 10/1979 | Germany ................................ 296/223 |
| 4107270 | 9/1992 | Germany ............................ 296/146.16 |
| 2195392 | 4/1988 | United Kingdom .............. 296/216.02 |

OTHER PUBLICATIONS

Suhner Transmission Expert. Miniature Flexible Shafts, A Small Part In Some Really Big Ideas, 4 pages, prior to Aug. 5, 1997.

Suhner Drawing entitled .187 Dia. Su–Flex Cable w/Flocking, Drawing No. A–250–4829 Rev. C, prior to Aug. 5, 1997.

Suhner Flexible Shafts Spiral Bevel Gears, pp. 1–40, prior to Aug. 5, 1997.

Installation Instruction Sheet, Part No. 12338591, 11 Sheets, (1994).

Six photos of Venting Roof, prior to Aug. 5, 1997.

German Publication, Patentanmeldung, Volkswagenwerk GmbH Wolfsburg, Mar. 22, 1956, 2 pages.

*Primary Examiner*—Dennis H. Pedder
*Attorney, Agent, or Firm*—Harness, Dickey & Pierce, P.L.C.

[57] ABSTRACT

A powered venting panel assembly includes a panel pivotable from a closed position to an open venting position, an automatic actuator, a linkage mechanism and a member coupling the automatic actuator to the linkage mechanism. In a further aspect of the present invention, the elongated member is a flexible cable. The window is a venting sunroof window in yet another aspect of the present invention.

20 Claims, 11 Drawing Sheets

POWERED VENTING PANEL ASSEMBLY

BACKGROUND AND SUMMARY OF THE INVENTION

This invention relates generally to automotive vehicles and specifically to a powered venting panel assembly employed in an automotive vehicle.

Many conventional automotive vehicles employ manually actuated venting sunroofs or pop-tops. These conventional venting sunroofs typically consist of a glass roof panel pivotable from a closed position, flush with the vehicle roof, to an open venting position by the vehicle occupant releasing and pivoting a latch. Air within the passenger compartment can be freely vented to the atmosphere outside of the vehicle through the sunroof opening when the window is in the venting position. This dramatically improves the HVAC (heating, venting and air conditioning) air flow patterns throughout the passenger compartment, especially when it is desired to keep the side windows in the raised position. It is also known to provide a pivoting side window with a manually actuated latch.

Examples of various manually actuated venting sunroofs are disclosed in the following U.S. Pat. No. 4,402,536 entitled "Sunroof Latching Mechanism" which issued to Green et al. on Sep. 6, 1983; U.S. Pat. No. 4,371,204 entitled "Pivotal Roof Vent Panel Apparatus" which issued to George et al. on Feb. 1, 1983; U.S. Pat. No. 4,231,609 entitled "Vehicle Sunroof Frame" which issued to Sorensen on Nov. 4, 1980; U.S. Pat. No. 4,193,628 entitled "Bayonet Structure for Detachable Sunroof" which issued to Sorensen on Mar. 18, 1980; U.S. Pat. No. 3,974,753 entitled "Automobile Roof Vent" which issued to Blomgren et al. on Aug. 17, 1976; and U.S. Pat. No. 3,949,624 entitled "Lifting Linkage for Roof Vent Panels of Automobile" which issued to Biernert on Apr. 13, 1976.

It is also known to mount an electric motor directly to a venting sunroof frame. In this construction, a short (less than about 50 millimeters), rigid and nonflexible armature extending from the electric motor rotates one or more gears for directly driving a toggle linkage mechanism in order to raise and lower a venting sunroof window. However, the electric motor is undesirably large and difficult to package in the vehicle's roof area. Thus, head room is detrimentally reduced. Furthermore, such a conventional arrangement creates an undesirable noise immediately adjacent to the occupant's ears. This motor is placed in an otherwise optimal location for an overhead dome lamp or headliner mounted overhead console.

Other traditional, horizontally sliding sunroofs have also been used. These devices employ one or more electric motors which push and pull cables for moving a sunroof window, sunshades or other adjacent members to forward, rearward or venting positions. Examples of these traditional pushed and pulled cable systems are disclosed in U.S. Pat. No. 5,154,482 entitled "Outer Sliding-Type Sunroof" which issued to Hayashi et al. on Oct. 13, 1992, and U.S. Pat. No. 5,018,783 entitled "Slidable, Foldable, and Removable Vehicle Sunroof" which issued to Chamings et al. on May 28, 1991.

Finally, it is also known to linearly slide a rear truck window along a single plane, from an open position to a closed position, by use of a rack provided on the truck window and pinion gear rotatably driven by a rectangular cross sectional cable spline and a remotely mounted electric motor. Such an apparatus is disclosed in U.S. Pat. No. 4,920,698 entitled "Powered Sliding Truck Cab Window" which issued to Friese et al. on May 1, 1990.

In accordance with the present invention, the preferred embodiment of a powered venting panel assembly includes a panel pivotable from a closed position to an open venting position, an automatic actuator, a linkage mechanism and an elongated member coupling the automatic actuator to the linkage mechanism. In another aspect of the present invention, the linkage mechanism is defined as a multi-link toggle mechanism which pivots a section of a window about a fixed window pivot axis. In a further aspect of the present invention, the elongated member is a flexible cable. The window is a venting sunroof window in yet another aspect of the present invention. Still another aspect of the present invention provides for remote positioning of a two-step reduction, electric motor within a passenger compartment of the automotive vehicle.

The powered venting panel assembly of the present invention is advantageous over conventional devices in that headroom intrusion and operational noise is minimized by remote placement of the electric motor away from the vehicle's roof area. Accordingly, flexibility of the cable promotes the easy routing and insertion of the cable within the hollow paths or box sections of the roof header and pillar formations to accommodate remote packaging of the electric motor at or below a beltline of the vehicle. The passenger compartment packaging of the electric motor protects same from rain and freezing water damage. The specific construction of the cable, including its generally cylindrical cross sectional nature, is important in reducing wear of adjacent sheaths and housings during prolonged use while also providing integral gear-like teeth for enmeshing with mating gears in an alternate embodiment. The present invention also allows for a reduction in gear components by directly coupling the rotating cable to a toggling link in a preferred embodiment. The specific electric motor and planetary gear transmission offers high torque and low output speed. In this advantageous arrangement, the electric motor operates at high revolutions per minute, low voltage and has a fairly small size thereby decreasing cost, packaging size and battery drain as compared to conventional motors and drive trains. Additional advantages and features of the present invention will become apparent from the following description and appended claims, taken in conjunction with the accompanying drawings.

DETAILED DESCRIPTION OF THE PREFERRED EMBODIMENT

Figure 1:
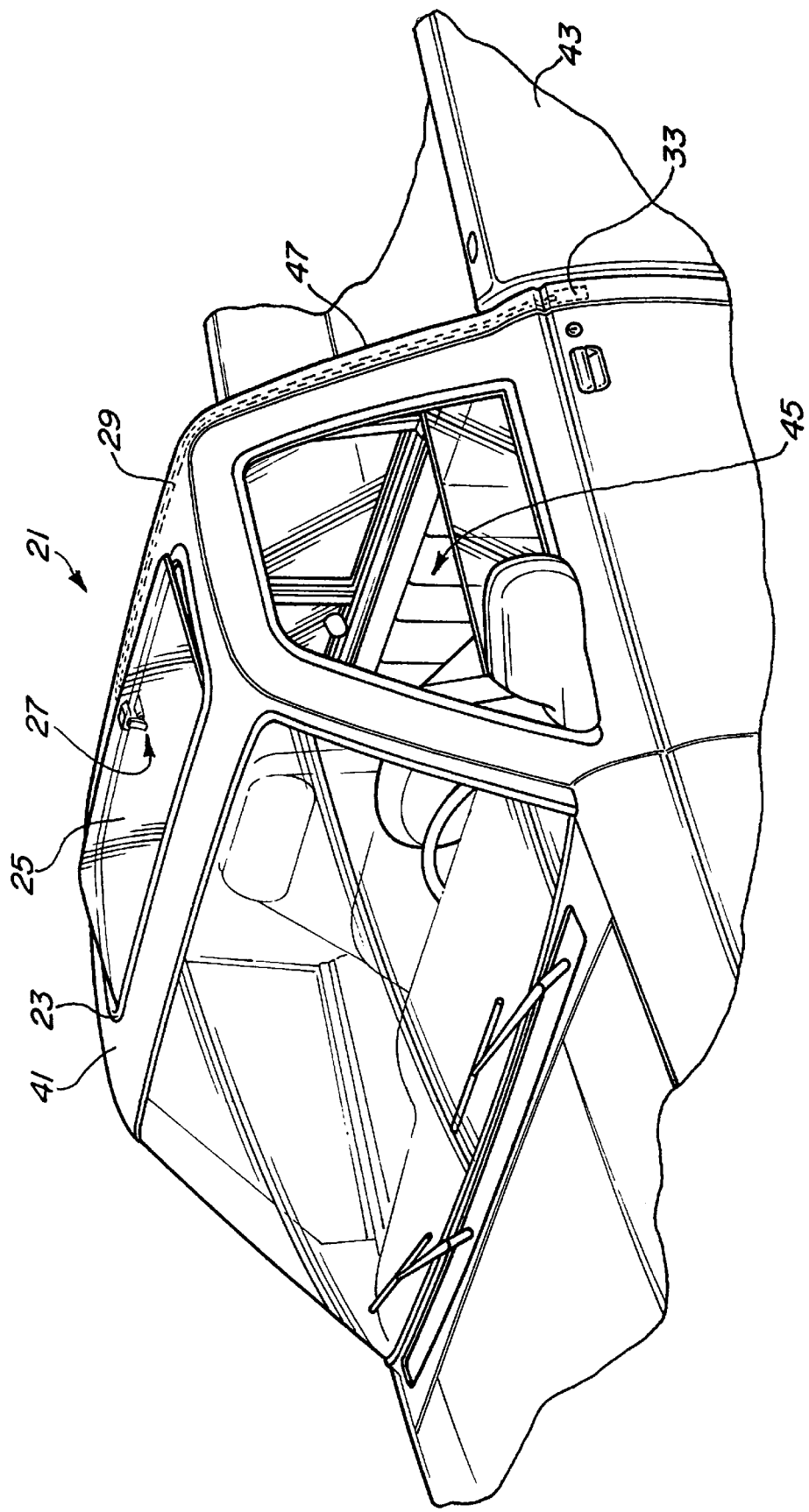
FIG. 1 is a perspective view showing a first preferred embodiment of a powered venting panel assembly of the present invention installed in a pickup truck automotive vehicle.
Figure 2:
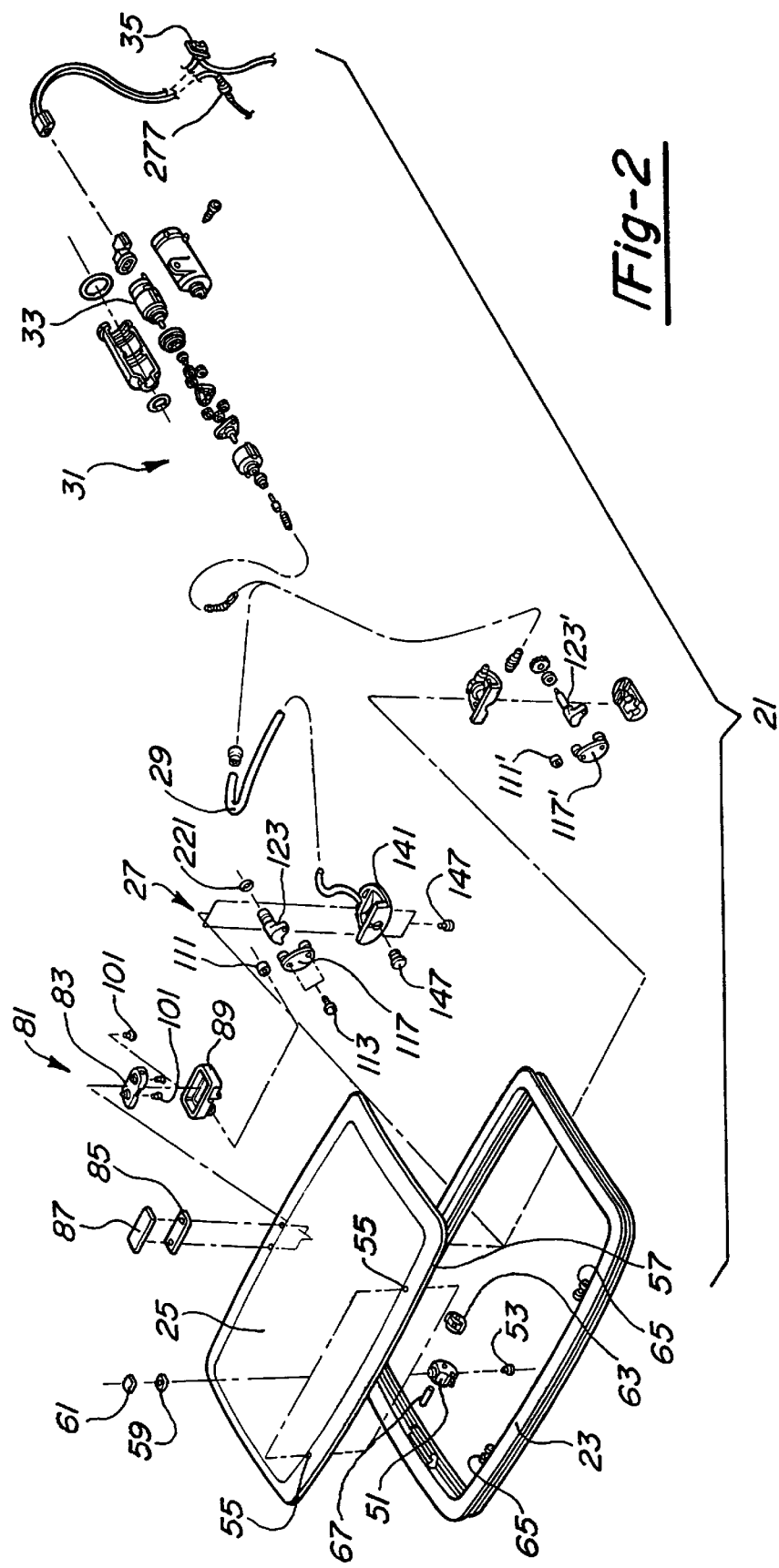
FIG. 2 is an exploded perspective view showing the first preferred embodiment and a first alternate embodiment of the powered venting panel assembly.
Figure 3:
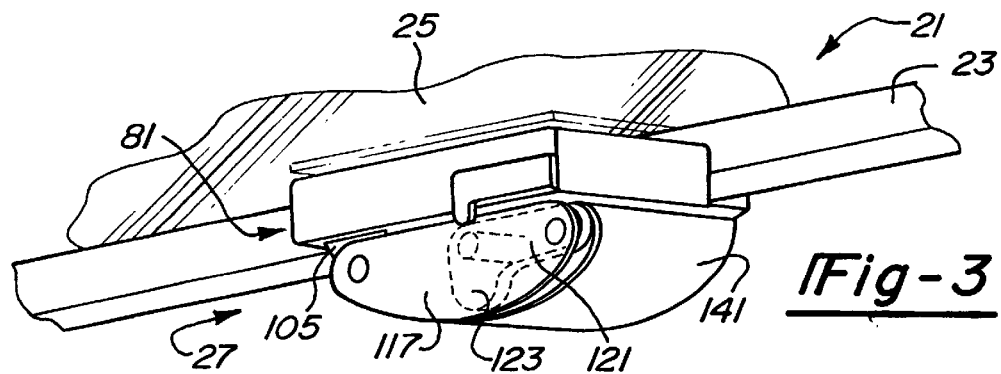
FIG. 3 is a perspective view showing the first preferred embodiment powered venting panel assembly in a closed position.
Figure 4:
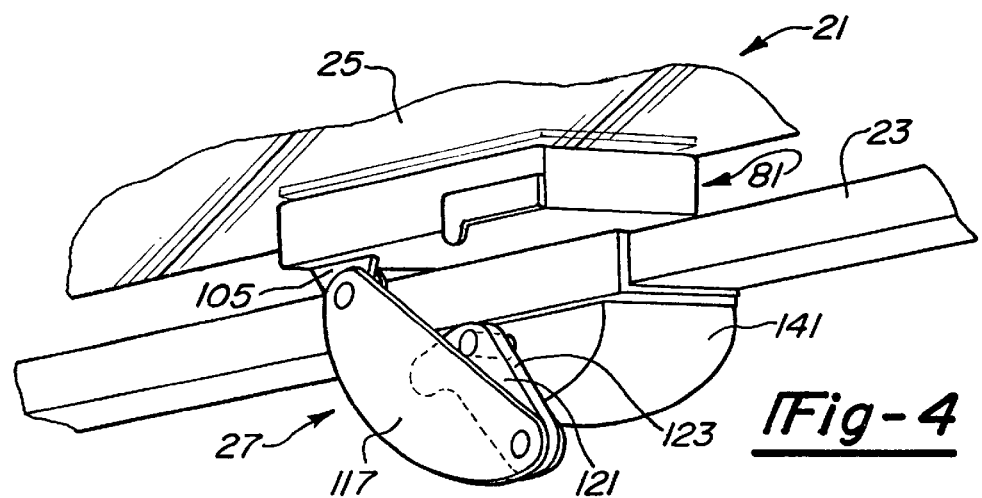
FIG. 4 is a perspective view showing the first preferred embodiment powered venting panel assembly in a partially open venting position.
Figure 5:
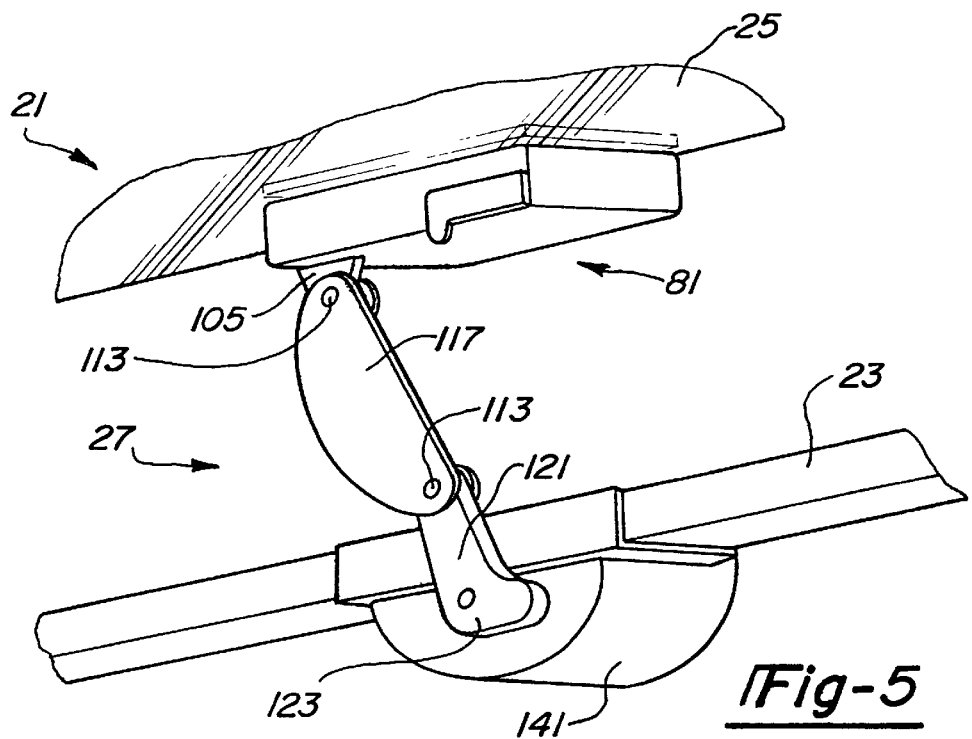
FIG. 5 is a perspective view showing the first preferred embodiment powered venting panel assembly in a fully open venting position.
Figure 6:
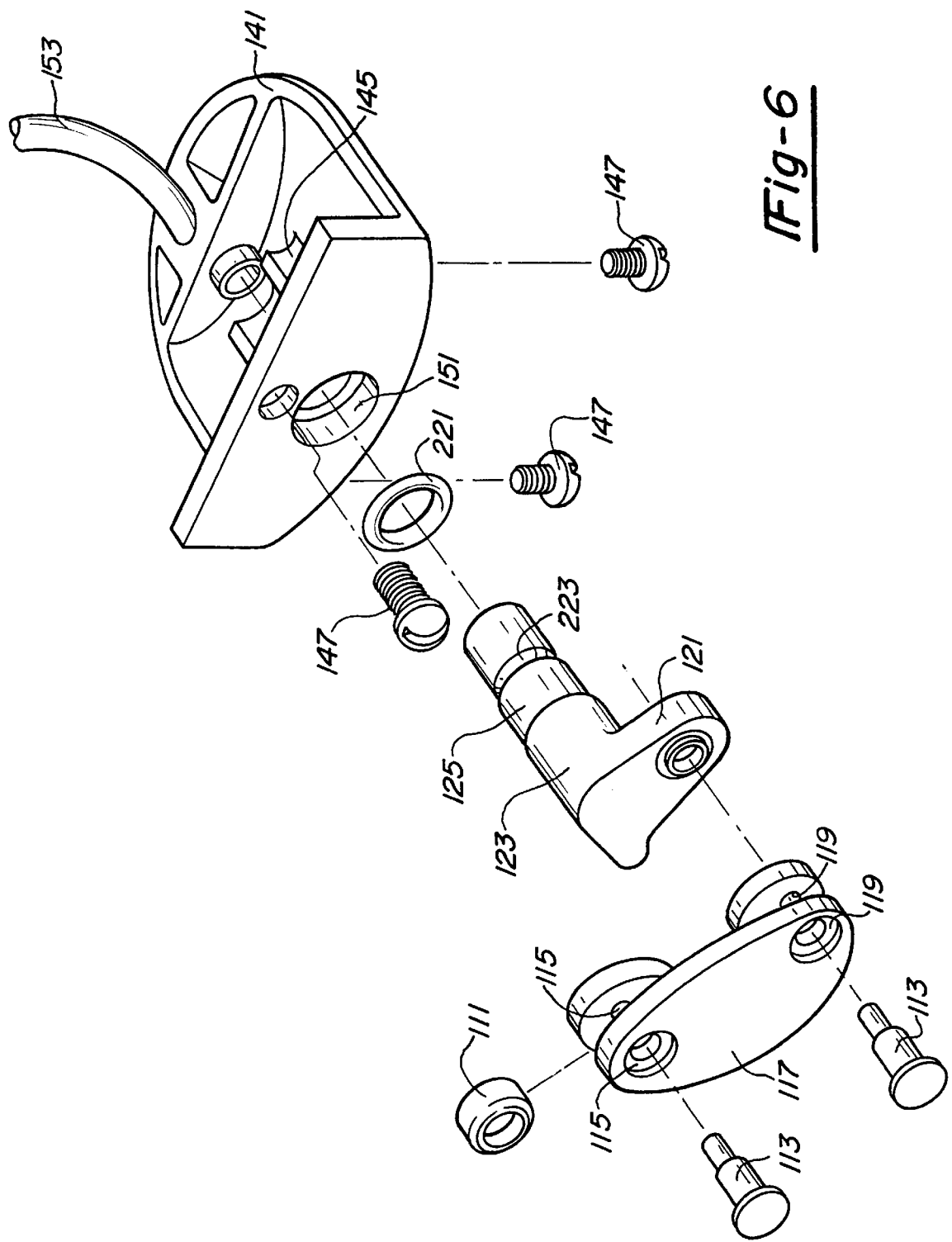
FIG. 6 is an exploded perspective view showing a portion of the first preferred embodiment powered venting panel assembly.

Referring to FIGS. 1 and 2, the first preferred embodiment of a powered venting panel assembly is a pop-top or pivoting sunroof 21 that includes a generally rectangular frame 23, a generally transparent and rigid window panel 25, a linkage assembly 27, a cable 29, a transmission 31, an electric motor 33 and an occupant accessible switch 35. Frame 23 has a pair of opposing legs which are clamped on either side of a sheet metal roof 41 of an automotive vehicle 43. Although automotive vehicle 43 is shown in FIG. 1 as a pickup truck, it may also be a heavy truck, such as that shown in FIG. 13, sedan or any other type of automotive vehicle. Transmission 31 and electric motor 33 are preferably remotely located within a passenger compartment 45 of vehicle 43, such as behind an occupant seating area or within a rearmost pillar 47 of the passenger compartment. Such a remote location positions transmission 31 and electric motor 33 away from the head room allocated area adjacent to frame 23. This may require that cable 29 be well over 300 millimeters or more in length with portions having 60 degree or greater angles relative to each other.

FIG. 2 illustrates a pair of pivot receptacles 51 each having a hollow boss through which a bolt 53 is inserted. Each bolt 53 further protrudes through holes 55 disposed adjacent to a front edge 57 of window 25. A relatively flat spacer 59 surrounds each bolt 53 on the exterior surface of window 25. An aesthetic cap 61 is then disposed to cover each spacer 59 and engage bolt 53 thereby securing pivot receptacle 51 to window 25. An upper end of a metal spring clip 63 abuts against an upper portion of each pivot receptacle 51 and a lower end of spring clip 63 abuts against a horizontally disposed pin of an adjacent pivot bracket 65. Each pivot bracket 65 has a pair of vertical walls affixed to frame 23. A claw is mounted upon a forward face of each pivot receptacle 51 for removably engaging the horizontally disposed pin of each pivot bracket 65. A pivot pin 67 is horizontally inserted through coaxially disposed openings within each pivot receptacle 51 and spring clip 63.

Figure 8:
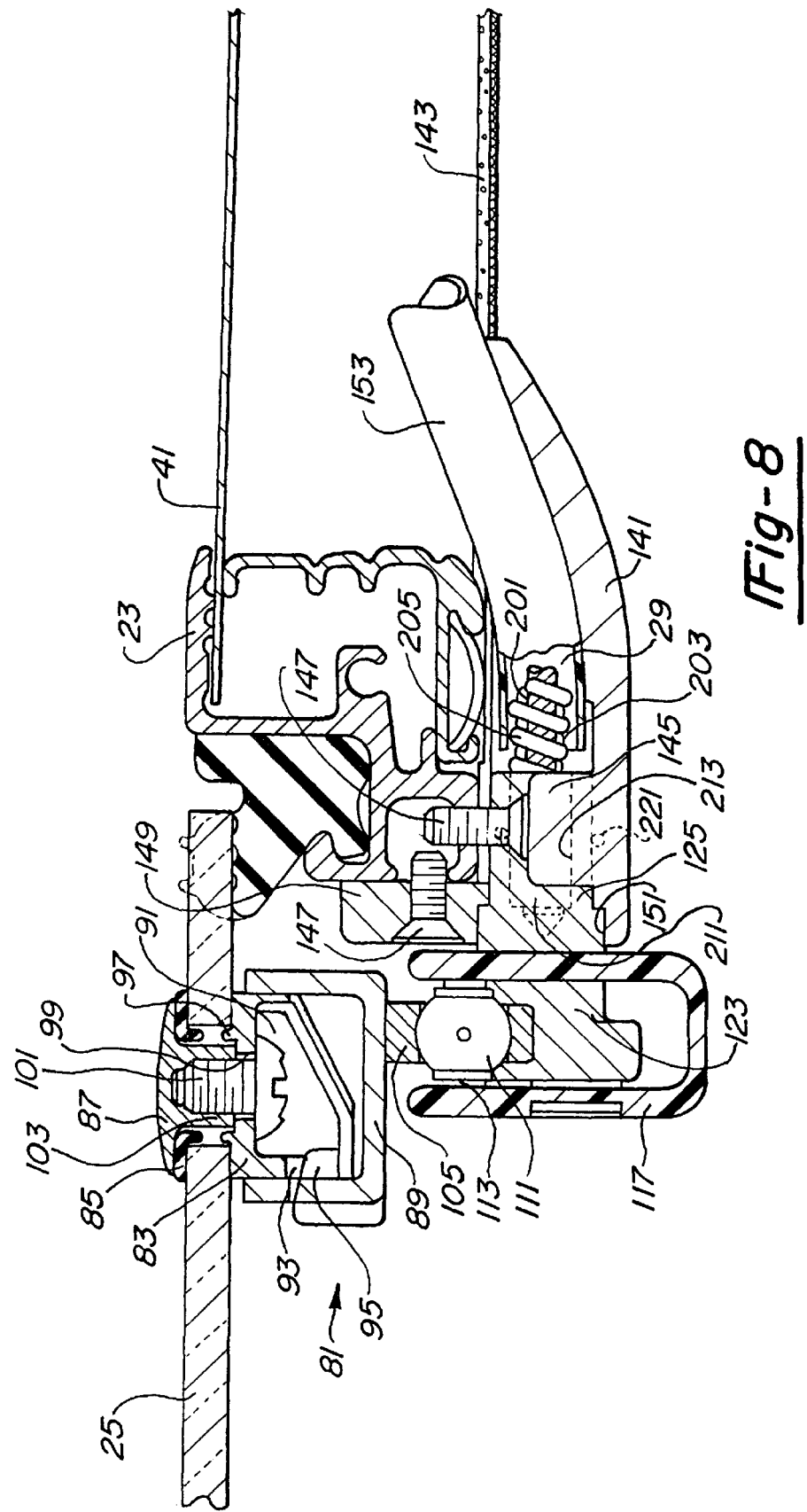
FIG. 8 is a cross sectional view, taken along line 8—8 of FIG. 7, showing the first preferred embodiment powered venting panel assembly.

A quick release rear window mounting structure 81 is best shown in FIGS. 2 and 8. Window mounting structure 81 includes a mounting box 83, a spacer plate 85, a cap 87 and a lock 89. Mounting box 83 has a hollow cavity 91 with an access slot 93 for removably receiving a snap-fit barb 95 of lock 89. A pair of bosses 97 and corresponding apertures 99 are disposed on an upper surface of mounting box 83 for receiving bolts 101. Each bolt 101 is enmeshed with a corresponding downwardly facing boss 103 depending from cap 87. Accordingly, glass 25 is cinched between mounting box 83 and spacer plate 85. Moreover, an apertured pivot tab 105 downwardly extends from lock 89. Lock 89 can be easily disconnected from mounting box 83 in a screw-free snap-fit manner by inserting a screwdriver within slot 93 so as to flexibly remove barb 95.

Linkage assembly 27 is illustrated in FIGS. 2–8. An annular and partially spherical coupling 111 is partially disposed within the aperture of tab 105. Coupling 111 is rotatably journalled about a steel shoulder rivet 113 which is affixed through a pair of aligned orifices 115 within a first end of a drive link 117. A second end of drive link 117 also has a set of aligned orifices 119 for fixedly receiving another shoulder rivet 113. Rivet 113 serves as a pivot pin about which is journalled an extension tab 121 of a cam link 123. Cam link 123 further has a shaft 125 which defines a primary rotational axis. Links 117 and 123, as well as coupling 111, are preferably injection molded from an engineering grade polymeric material. Link assembly 27 acts in a toggling manner when operated, to move window 25 from the fully closed position shown in FIG. 3 to the fully open venting position shown in FIG. 5.

An injection molded, polymeric housing 141 is disposed against a bottom surface of a headliner 143 consisting of a polyurethane foam or fiberglass substrate covered by an aesthetic covering material such as fabric or vinyl. Housing 141 has a partially circular-cylindrical cradle 145 for receiving shaft 125 of cam link 123. Three bolts 147 serve to mount housing 141 to frame 23. A forward facing wall 149 of housing 141 also contains a bore 151 for rotatably locating and supporting enlarged portion of shaft 125 of cam link 123. A steel cable guide tube 153 rearwardly projects from housing 141. Alternately, a flexible, polymeric guide tube could be employed.

Figure 7:
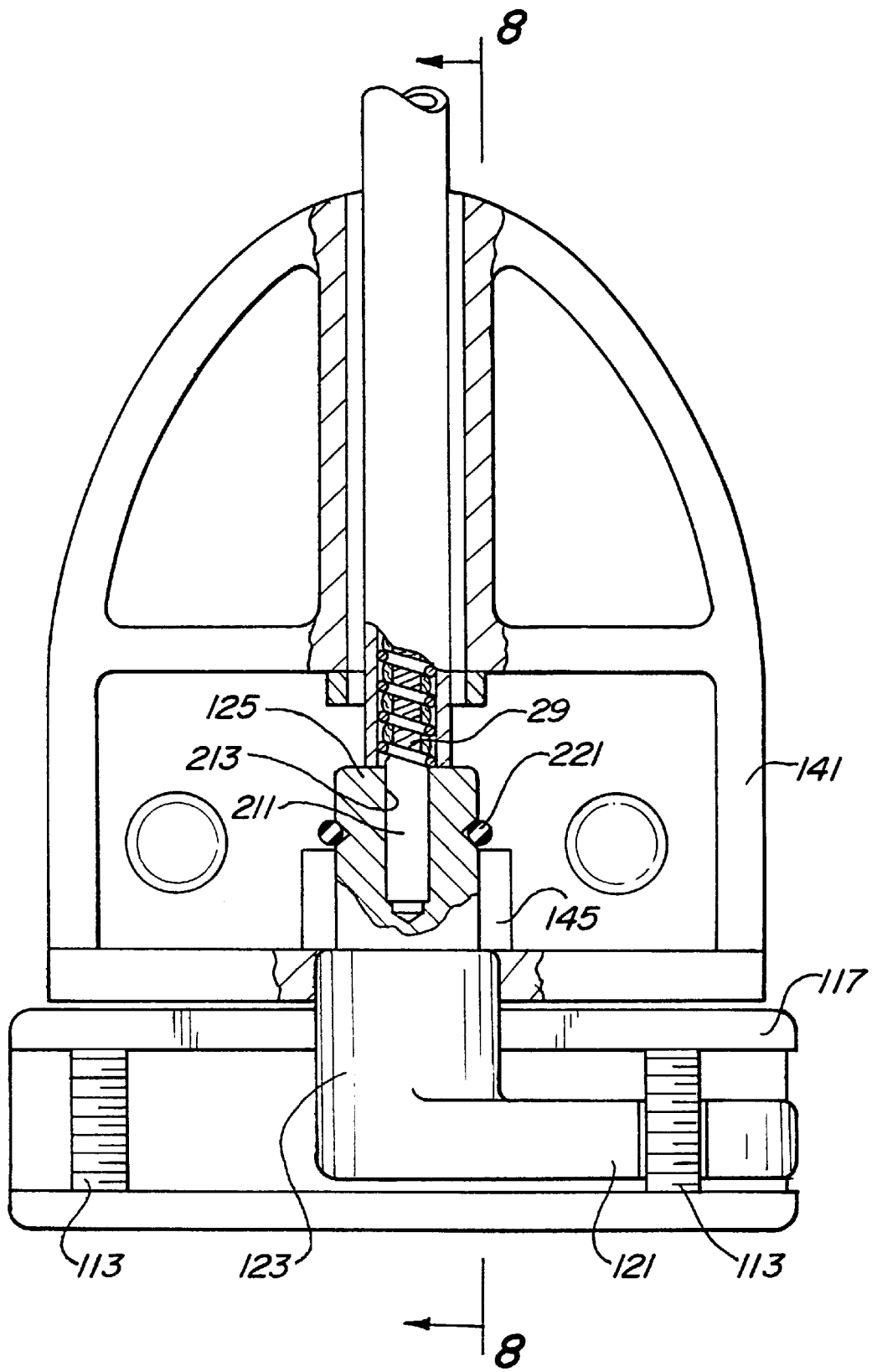
FIG. 7 is a fragmentary and enlarged top elevational view showing the portion of the first preferred embodiment powered venting panel assembly of FIG. 6.

Referring now to FIGS. 7 and 8, cable 29 has a pair of oppositely helically wound and angled concentric steel wire cores 201 surrounded by a flocked covering 203. A 1.1 mm (0.045 inch) diameter, helically wound steel wire 205 is tightly wrapped around the outside surface of flocked covering 203. SU-FLEX brand flocked cable, which can be purchased from Suhner Manufacturing, Inc. of Rome, Ga., has been found to be suitable. Cores 201, covering 203 and outer wire 205 all are rotated together at a high rpm as will be described in more detail hereinafter.

A flexible, polymeric sheath surrounds the majority of the length of cable 29 and is attached to steel guide tube 153. Cable 29 has a generally circular-cylindrical cross sectional shape. A polymeric or metallic end fitting 211 is molded or otherwise secured upon a distal end of cable 29. End fitting 211 has a square cross sectional shape for engaging, in a keyhole fashion, with a mating square cross sectionally shaped receptacle 213, which is longitudinally elongated and disposed internal to shaft 125 of cam link 123. Accordingly, rotation of cable 29 serves to directly rotate cam link 123 which is directly coupled thereto without the need for intermediate gearing or the like. This direct connection serves to reduce expensive gear parts which are often prone to premature tooth failure or teeth disengagement under load. This construction also allows for easy and quick assembly without the need for precise alignment of multiple gear teeth with rigid rods or armature shafts; this significantly reduces manufacturing costs. The housing package is also considerably smaller, thereby intruding less into the head room area, than would geared embodiments at the linkage assembly. A steel clutch cable ring 221 is snapped onto shaft 125 and received into an annular groove 223.

Figure 9:
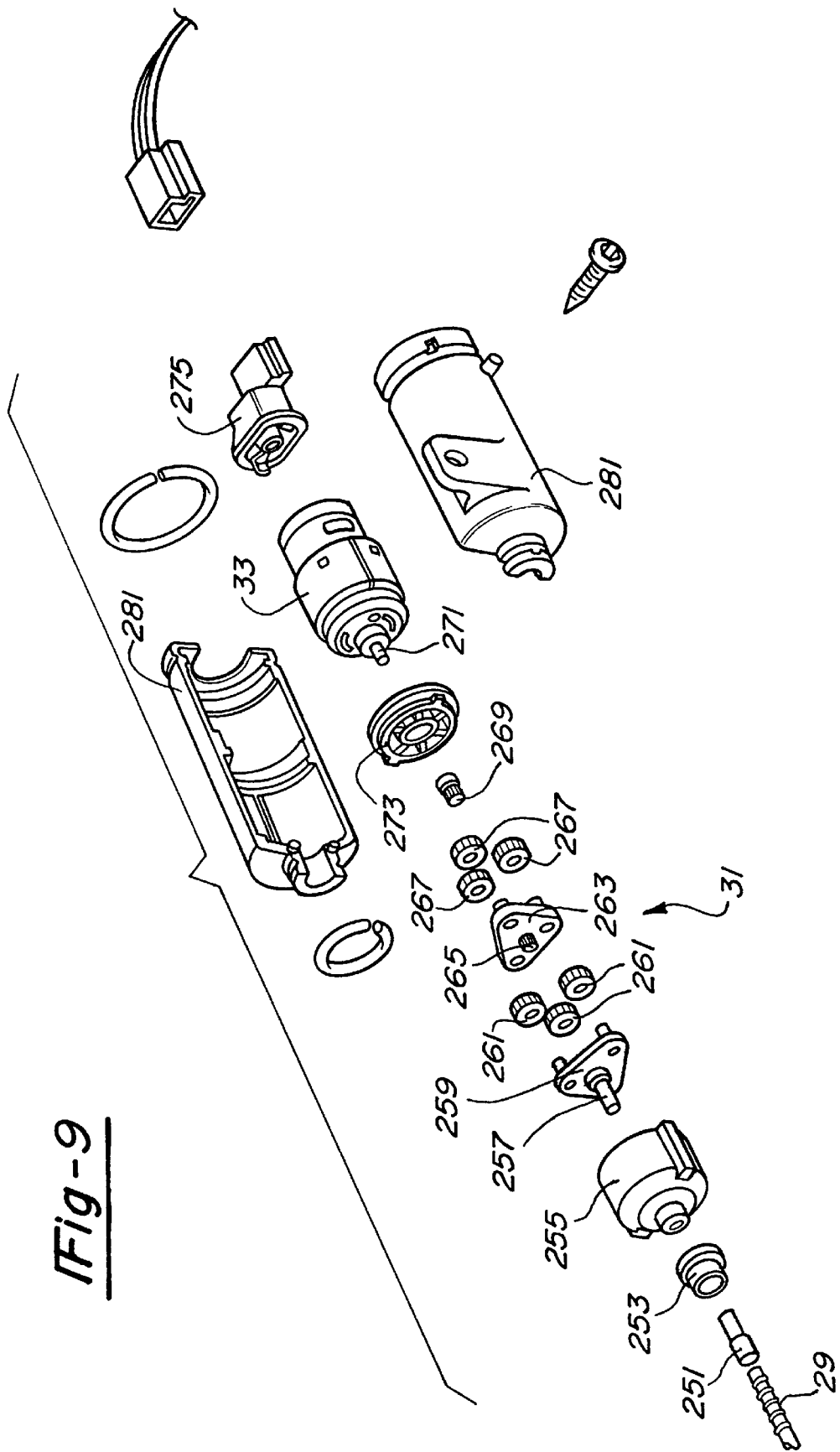
FIG. 9 is an exploded perspective view showing an electric motor and drive transmission employed in the first preferred embodiment powered venting panel assembly.

FIG. 9 shows the remotely located transmission 31 and motor 33. A second end fitting 251 is molded or otherwise formed onto a proximal end of cable 29. Second end fitting 251 is inserted into a steel drive output adapter 253 which is mounted upon a transmission casing 255. Casing 255 is preferably die cast from zinc. An output shaft 257 of a second stage planetary gear carrier 259 is engaged with adapter 253 so as to drivable rotate cable 29. Three second stage planetary gears 261 are journalled upon corresponding pins of carrier 259. A first stage planetary gear carrier 263 has a central sun gear 265 which serves to drive planetary gears 261. A first stage set of planetary gears 267 are likewise journalled about corresponding pins extending from carrier 263. These planetary gears 267 are driven by a first stage sun gear 269 mounted upon and driven by an armature shaft 271 of motor 33. The sun gears and planetary gear carriers are all preferably made from powdered metal while the planetary gears are either made from powdered metal or a polymeric material. A backplate spacer 273 is disposed between planetary gears 267 and electric motor 33. Electric motor 33 is of a fractional horsepower, direct current variety. An electrical connector 275 is attached to the backside of electric motor 33 and connected to a reversible relay (not shown), occupant accessible switch 35 and a fuse 277 (see FIG. 2). A polymeric motor housing 281 is mounted around electric motor 33 and transmission 31.

Figure 10:
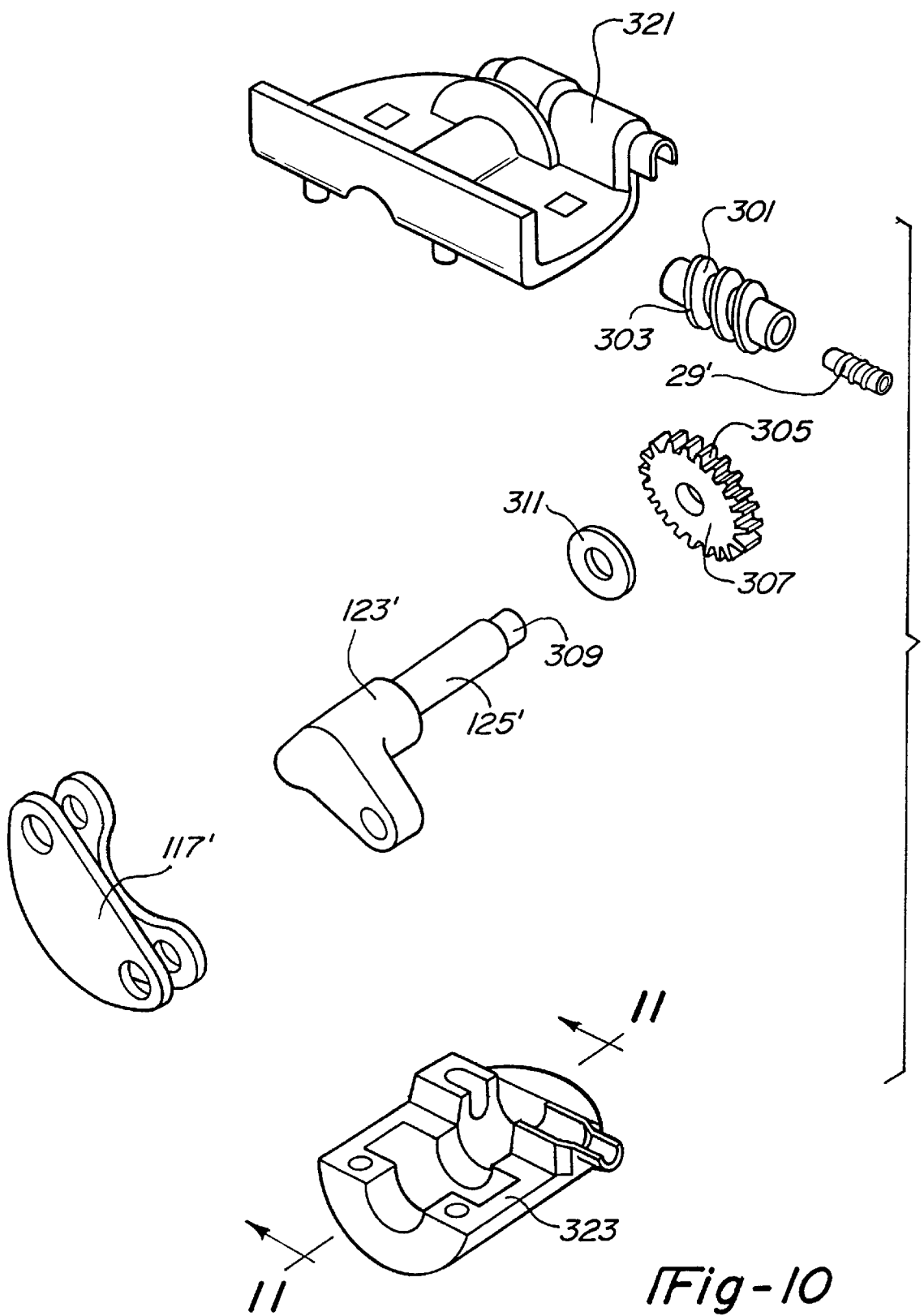
FIG. 10 is an exploded perspective view showing the first alternate embodiment portions of the powered venting panel assembly.
Figure 11:
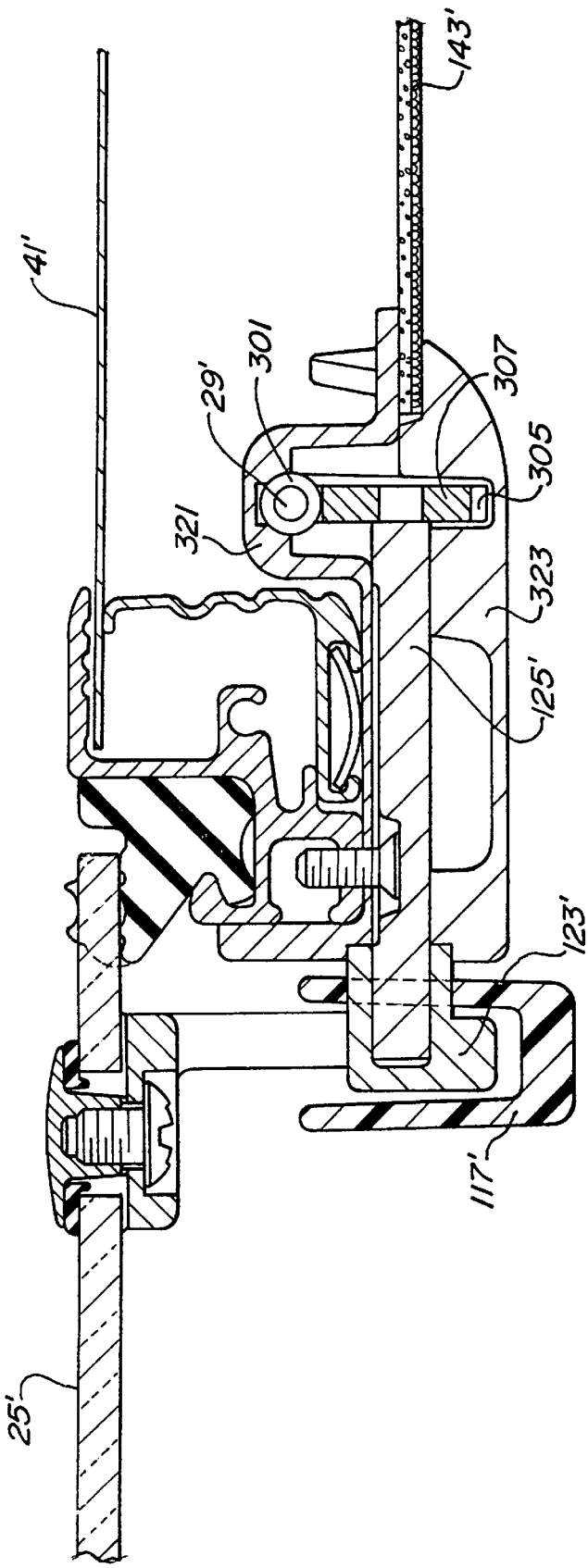
FIG. 11 is a cross sectional view, taken along line 11—11 of FIG. 10, showing the first alternate embodiment powered venting panel assembly.

An alternate embodiment of the powered venting panel assembly is illustrated in FIGS. 2, 10 and 11. In this embodiment, the apparatus is the same as previously described with the first preferred embodiment except that the means of coupling cable 29 to cam link 123 is different. A worm gear end fitting 301 is secured upon a distal end of cable 29' for concurrent rotation therewith. Helical teeth 303 of worm gear end fitting 301 are enmeshed with teeth 305 of a driven gear 307. Gear 307 is press-fit onto a stepped end 309 of cam link shaft 125'. An optional thrust washer 311 may also be employed. Worm gear end fitting 301, gear 307 and shaft 125' are rotatably mounted between upper and lower housings 321 and 323, respectively. This alternate embodiment is better suited for high torque applications. A quick connect window mounting may or may not be employed.

Figure 12:
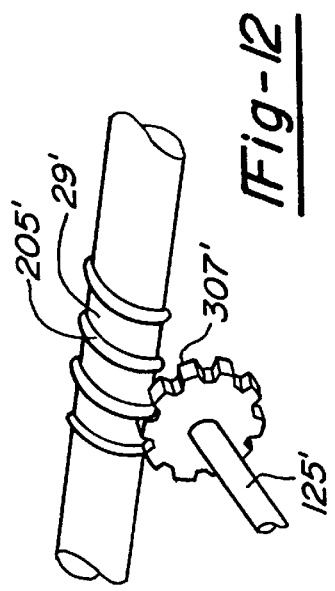
FIG. 12 is a fragmentary perspective view showing a second alternate embodiment of the powered venting panel assembly.

In yet another alternate embodiment, as shown in FIG. 12, the helically wound wire 205' of cable 29' acts as worm gear teeth when cable 29' is rotated such that it directly drives bevel driven gear 307'. Gear 307' is similarly connected to cam link shaft 125'. This is advantageous by achieving many of the benefits of a worm gear while employing a flexible cable but without a unique end fitting.

Figure 13:
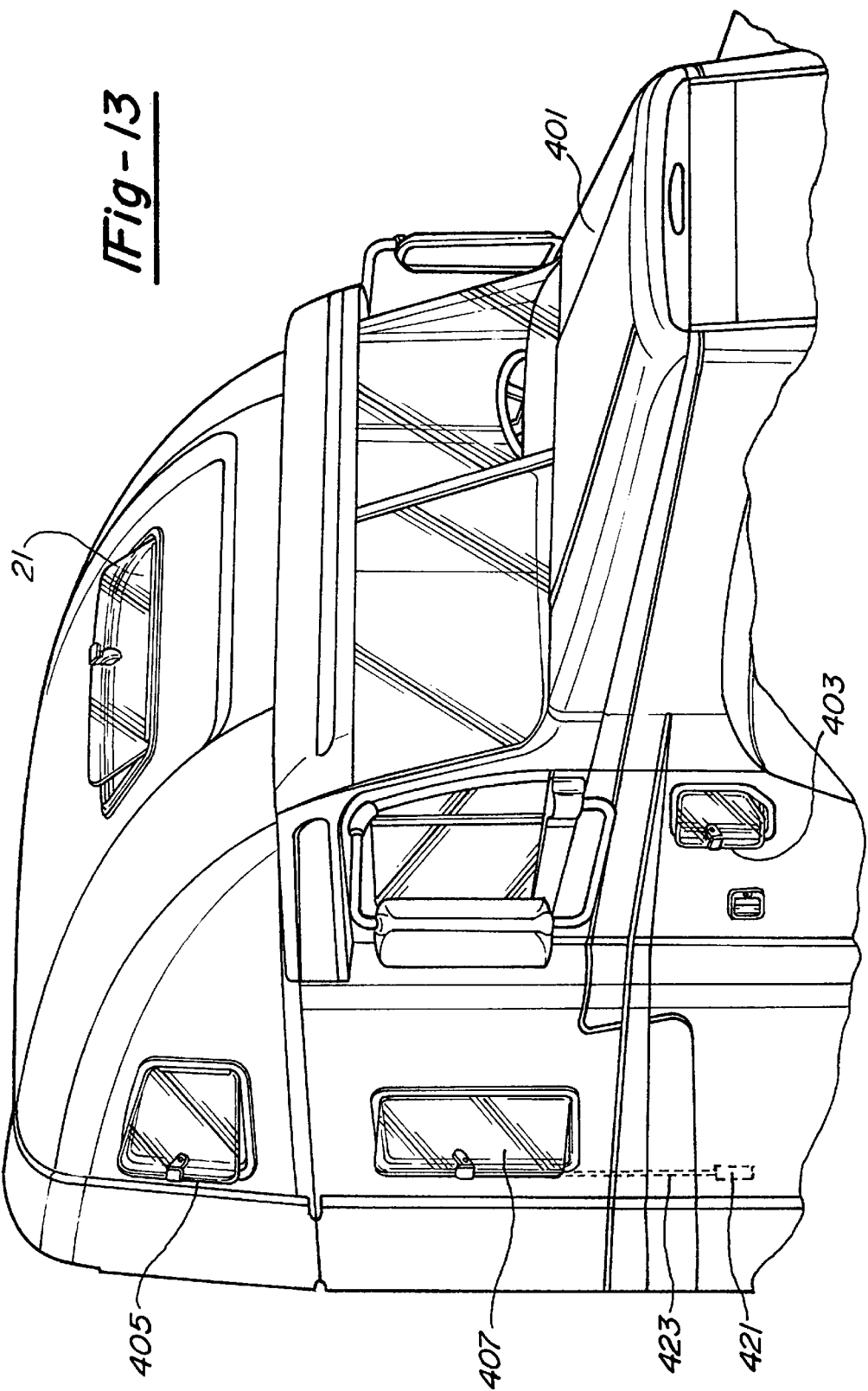
FIG. 13 is a perspective view showing the first preferred embodiment and a second preferred embodiment of powered venting panel assemblies employed in the cab of a heavy truck automotive vehicle.
Figure 14:
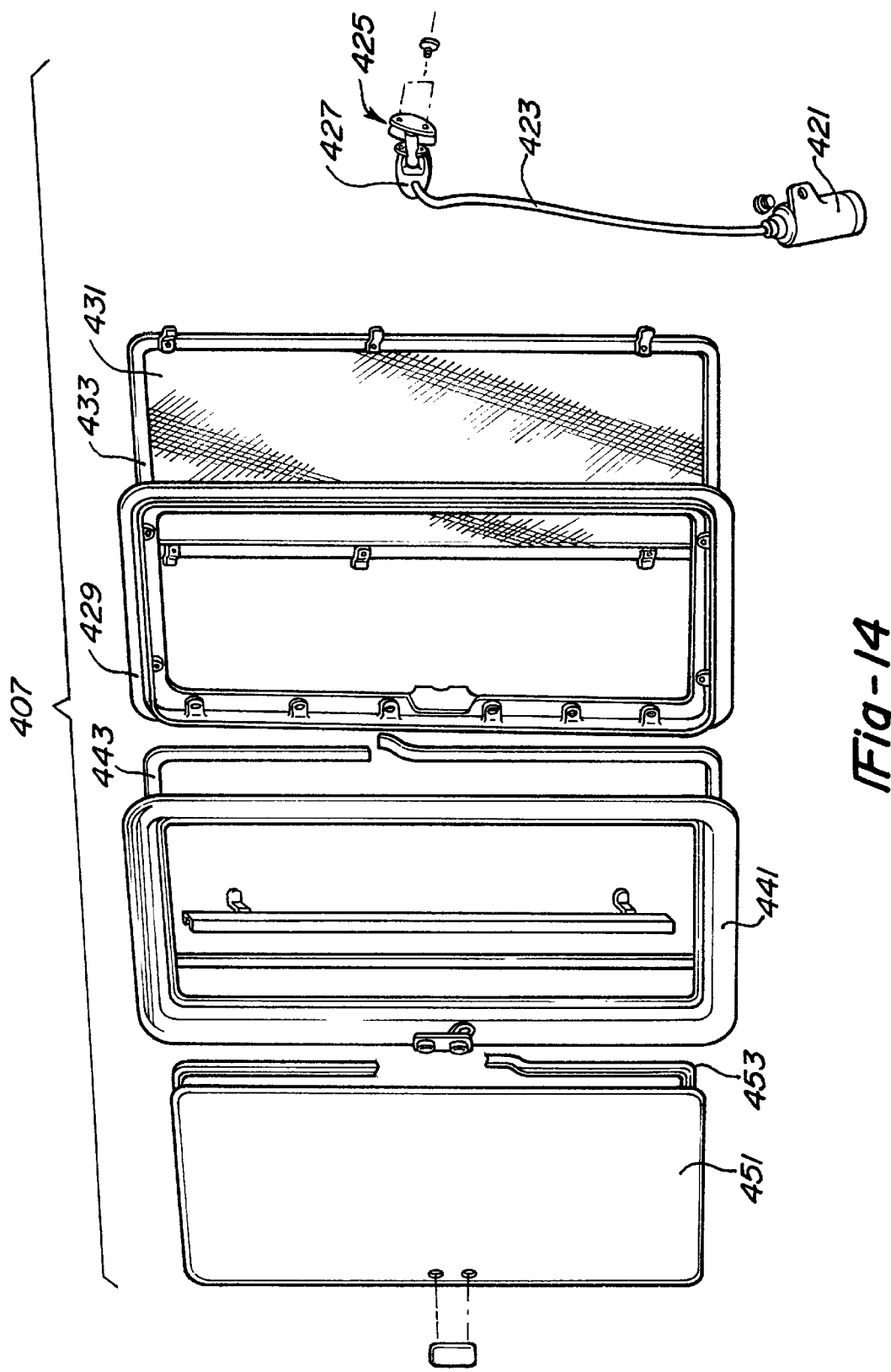
FIG. 14 is an exploded perspective view showing the second preferred embodiment of the powered venting panel assembly.

FIG. 13 shows a heavy truck cab automotive vehicle 401 employing the preferred embodiment powered sunroof 21 in addition to other preferred embodiment powered venting side window panels 403, 405 and 407. As shown in FIG. 14, powered venting window 407 employs a remotely located electric motor and drive transmission assembly 421, rotating cable 423 and toggling linkage assembly 425, essentially the same as the previously described embodiments. However, a housing 427 which rotatably journals the cam link shaft, is fixedly secured to an interior window frame 429. A screen 431 and screen frame 433 are removably bolted to interior frame 429. An outer window opening frame 441 and a seal 443 are bolted to interior frame 429. A generally transparent window 451 is pivotally mounted to outer frame 441 in a manner similar to that disclosed in FIG. 2, although a quick connect coupling may not be desired for this side window application. A weatherstrip 453 is also provided.

While many preferred and alternate embodiments have been described, it is also envisioned that a variety of other constructions can be used. For example, other gearing combinations may be provided in the drive transmission and cable to linkage coupling. Furthermore, alternate linkage assemblies can be driven by a rotating cable or the like. A painted and rigid metal panel may be used in place of the glass sunroof panel. Moreover, it is envisioned that other flexible, elongated members may be used beyond the preferably disclosed cable. Various materials have been disclosed in an exemplary fashion, however, other materials may of course be employed. It is intended by the following claims to cover these and any other departures from the disclosed embodiments which fall within the true spirit of this invention.

The invention claimed is:

1. A powered venting panel assembly for use in an automotive vehicle, said assembly comprising:
    a substantially rigid panel;
    a linkage mechanism having a toggle link coupled to said panel and having a cam link coupled to said toggle link, said cam link having a rotating shaft with a substantially horizontal rotational axis;
    a stationary housing having a cradle, said shaft of said cam link operably rotating in said cradle;
    an electric motor; and
    an elongated and flexible member operably rotating about its centerline upon energization of said electric motor, an elongated segment of said member opposite said electric motor having a rotational axis substantially parallel to said rotational axis of said shaft of said cam link, said elongated segment being coupled to said shaft;
    wherein rotation of said elongated member causes said shaft of said cam link to rotate and move said toggle link which moves at least a section of said panel from a closed position to an open position, said closed and open positions being located on separate planes.

2. The assembly of claim 1 wherein said elongated member is a cable.

3. The assembly of claim 2 wherein said cable includes:
    a metallic core;
    a covering surrounding and rotating with said core; and
    a helically wound wire externally surrounding said casing and acting as teeth of a worm gear.

4. The assembly of claim 2 further comprising:
    a separate worm gear segment being attached to said cable; and
    a driven gear enmeshed with said worm gear segment;
    said shaft of said linkage mechanism rotating in response to rotation of said driven gear, said worm gear segment rotating concurrently with said cable.

5. The assembly of claim 1 further comprising a substantially rectangular frame defining a window opening in a fixed roof of said automotive vehicle, said panel being defined as a substantially transparent sunroof window pivotably coupled to said frame, and a hinging mechanism causing a portion of said window to be linearly fixed relative to said fixed roof of said automotive vehicle.

6. The assembly of claim 5 wherein said hinging mechanism includes:

a pivot bracket mounted to said frame;

a pivot receptacle mounted to said window, said pivot receptacle being removably coupled to said pivot bracket;

said stationary housing secured to said frame substantially opposite from said pivot bracket; and a structure mounted to said window substantially opposite from said pivot receptacle, a portion of said toggle mechanism having a detachable coupling coupled to said structure.

7. The assembly of claim 1 wherein said electric motor is remotely located away from said panel and said linkage mechanism by at least a 300 millimeter length of said elongated member, one portion of said elongated member is flexibly and angularly offset from another portion of said elongated member by at least 60°, said electric motor is mounted in a passenger compartment of said automotive vehicle.

8. The assembly of claim 7 further comprising:
an armature disposed in said electric motor;
a first sun gear operably driven by said armature;
a first planetary gear set operably driven by said first sun gear;
a second sun gear operably driven by said first planetary gear set;
a second planetary gear set operably driven by said second sun gear;
an output member operably driven by said second planetary gear set; and
a proximal end of said elongated member rotatably driven by said output member upon energization of said electric motor.

9. A powered venting window assembly for use in an automotive vehicle, said assembly comprising:
a window pivotable from a closed position to an open venting position, a hinging mechanism causing a portion of said window to be substantially fixed in a linear fore and aft direction relative to said automotive vehicle;
an automatic actuator;
a linkage mechanism coupling said window to said automotive vehicle, said linkage mechanism including a cam link having a circular-cylindrical shaft and a depending tab, a first pivot axis passing through said tab, said linkage mechanism further including a toggle link having a first end pivotably coupled to said panel and having a second end pivotably coupled to said tab for relative pivotal movement about said pivot axis;
a stationary housing having a cradle, said shaft of said cam link operably rotating in said cradle; and
a rotatable cable coupled to said actuator, an end of said cable coaxially located inside said shaft of said cam link, energization of said actuator causing said cable to rotate about is centerline without substantially moving in a linear direction, said cable being operable to rotate at least a portion of said linkage mechanism;
said actuator being remotely located with respect to said window and said linkage mechanism.

10. The assembly of claim 9 wherein said toggle link has a substantially U-cross sectional shape.

11. The assembly of claim 9 wherein said cable includes:
a metallic core;
a covering surrounding and rotating with said core; and
a helically wound wire externally surrounding said casing and acting as teeth of a worm gear.

12. The assembly of claim 9 further comprising:
a substantially rectangular frame defining a window opening in said automotive vehicle;
a pivot bracket mounted to said frame;
a pivot receptacle mounted to said window, said pivot receptacle being removably coupled to said pivot bracket;
a first structure secured to said frame substantially opposite from said pivot bracket;
said linkage assembly having a first portion pivotably mounted to said first structure and a second portion pivotably coupled to said first portion; and
a second structure mounted to said window substantially opposite from said pivot receptacle, said second portion being pivotably coupled to said second structure in a removable and snap-fit manner.

13. The assembly of claim 9 further comprising:
an armature disposed in said actuator;
a first sun gear operably driven by said armature;
a first planetary gear set operably driven by said first sun gear;
a second sun gear operably driven by said first planetary gear set;
a second planetary gear set operably driven by said second sun gear;
an output member operably driven by said second planetary gear set; and
a proximal end of said cable operably rotatable by said output member upon energization of said actuator.

14. A powered venting sunroof for an automotive vehicle, said sunroof comprising:
a frame;
a rigid sunroof panel hingedly coupled to said frame and pivotable from a closed position to a venting position;
a single, elongated and flexible cable;
a linkage mechanism coupling said panel to said cable, said linkage mechanism including a first link pivotably coupled to said panel and a second link pivotably coupled to said first link, said second link having a rotatable shaft adjacent an end opposite an end pivotably coupled to said first link, said centerline of said cable adjacent to said shaft being substantially parallel to a rotational axis of said shaft, said rotational axis of said shaft being substantially horizontally oriented, said cable being drivably coupled to said shaft; and
an electric motor operable to rotate said cable around said centerline of said cable thereby causing said panel to move between said closed and venting positions.

15. The assembly of claim 14 further comprising:
a separate worm gear segment attached to said cable; and
a driven gear enmeshed with said worm gear segment;
said shaft of said linkage mechanism operably rotating in response to rotation of said driven gear, said worm gear segment rotating concurrently with said cable.

16. The assembly of claim 14 further comprising:
a frame;
a pivot bracket mounted to said frame;
a pivot receptacle mounted to said window, said pivot receptacle being removably coupled to said pivot bracket;
a first structure secured to said frame substantially opposite from said pivot bracket; and a second structure mounted to said window substantially opposite from said pivot receptacle, a second portion of said first link pivotably coupled to said second structure in a removable and screw-free manner.

17. The sunroof of claim 14 further comprising an end fitting mounted on an end of said cable, said end fitting having a polygonal shape locking into a matching internal shape of said shaft, wherein said end of said cable is coaxially located inside said shaft.

18. The assembly of claim 17 wherein said cable includes:

a metallic core;

a covering surrounding and rotating with said core; and a helically wound wire externally surrounding said casing and acting as teeth of a worm gear.

19. The assembly of claim 14 further comprising:

an armature located in said electric motor;

a first sun gear operably driven by said armature;

a first planetary gear set operably driven by said first sun gear;

a second sun gear operably driven by said first planetary gear set;

a second planetary gear set operably driven by said second sun gear;

an output member operably driven by said second planetary gear set; and a proximal end of said cable rotatably driven by said output member upon energization of said electric motor.

20. The assembly of claim 14 wherein said electric motor is remotely located away from said panel and said linkage mechanism by at least a 300 millimeter length of said cable, one portion of said cable is flexibly and angularly offset from another portion of said elongated member by at least 60°.

* * * * *

UNITED STATES PATENT AND TRADEMARK OFFICE
CERTIFICATE OF CORRECTION

PATENT NO. : 6,073,995
DATED : June 13, 2000
INVENTOR(S) : George W. Klein

It is certified that error appears in the above-identified patent and that said Letters Patent is hereby corrected as shown below:

Column 6, line 53, delete "being".

Signed and Sealed this

First Day of May, 2001

Attest:

NICHOLAS P. GODICI

*Attesting Officer*     *Acting Director of the United States Patent and Trademark Office*